United States Patent [19]
van Daele

[11] Patent Number: 5,765,503
[45] Date of Patent: Jun. 16, 1998

[54] POULTRY FEEDING DEVICE

[75] Inventor: Antoine Achiel van Daele, Eeklo, Belgium

[73] Assignee: Roxell, N.V., Maldegem, Belgium

[21] Appl. No.: 411,629

[22] PCT Filed: Sep. 28, 1993

[86] PCT No.: PCT/EP93/02652

§ 371 Date: Apr. 5, 1995

§ 102(e) Date: Apr. 5, 1995

[87] PCT Pub. No.: WO94/07360

PCT Pub. Date: Apr. 14, 1994

[30] Foreign Application Priority Data

Oct. 5, 1992 [NL] Netherlands ............................. 9201721

[51] Int. Cl.$^6$ ............................................. A01K 5/02
[52] U.S. Cl. ........................... 119/52.4; 119/53; 119/57.4
[58] Field of Search .......................... 119/52.4, 53, 57.4

[56] References Cited

U.S. PATENT DOCUMENTS

| | | | |
|---|---|---|---|
| 503,664 | 8/1893 | Jones | 119/53 |
| 2,875,729 | 3/1959 | Gibson | 119/52 |
| 2,884,899 | 5/1959 | Jackson et al. | 119/53 |
| 3,230,933 | 1/1966 | Myers et al. | 119/53 |
| 3,585,970 | 6/1971 | Reese et al. | 119/53 |
| 4,216,742 | 8/1980 | Kirchofer | 119/53 X |
| 5,101,766 | 4/1992 | Runion | 119/53 |
| 5,462,017 | 10/1995 | Pollock et al. | 119/53 X |

FOREIGN PATENT DOCUMENTS

| | | | |
|---|---|---|---|
| 2509961 | 1/1983 | France | A01K 39/014 |
| 2669187 | 5/1992 | France | A01K 39/012 |
| 221055 | 4/1985 | Germany | A01K 30/00 |
| 49-789 | 10/1974 | Japan | A01K 39/00 |
| 55-40208 | 10/1980 | Japan | A01K 39/01 |
| 1022509 | 3/1966 | United Kingdom . | |

Primary Examiner—Robert P. Swiatek
Assistant Examiner—Elizabeth Shaw
Attorney, Agent, or Firm—Deveau, Colton & Marquis

[57] ABSTRACT

A feeding device for birds, in particular for breeders with a limited, predetermined daily ration of feed. The device has a dish-shaped pan with a bottom and upright peripheral wall, a drop tube with an open upper end which can be coupled to a feed supply system. The drop tube also has a lower end which is situated above the dish-shaped pan. The sum of the volume of the dish-shaped pan and the feed volume of the drop tube is at most equal to the volume of the sum of the daily rations of feed for the birds feeding at the device at the same time. A filling element may be provided in the drop tube, spaced from the inner wall of the drop tube.

16 Claims, 6 Drawing Sheets

POULTRY FEEDING DEVICE

The invention relates to a feeding device for birds, in particular for breeders with a limited, predetermined daily ration of feed, comprising: an essentially dish-shaped pan with a bottom and an upright peripheral wall; and a drop tube with an open upper end which is adapted to be coupled with a feed supply tube of a feed supply system containing a number of feeding devices, and with an open lower end which is situated above the dish-shaped pan.

Similar devices are known in many embodiments, e.g. from EP-A-0 421 553, and are intended primarily for raising broilers in large-scale breeding farms with birds, such as chickens, walking freely in closed breeding houses. For this kind of use it is important to have sufficient feed available in the feeding devices at any time, so that the birds right from the moment they are put in the breeding house continuously can find feed, and in this way grow to the desired weight in the shortest possible time.

For breeders, i.e. female or male animals which are destined to provide offspring, other standards apply, which can be derived from GB-A-1 022 509. To be sure, the birds also in this case should have unlimited access to feed in the feeding device till the time they are about one to three weeks old, but after that time the feed is strongly rationed to prevent the birds from gaining too much weight; from then on the birds are only fed once a day with an accurately predetermined daily ration of feed for each bird. In the case of rationing, at the moment the feeding starts, the birds have a great need for feed, and it is therefore of the utmost importance that all feeding devices, e.g. as disclosed in U.S. Pat. No. 3,230,933, are filled simultaneously to enable each bird to eat its daily ration, but no more than that.

In the prior art feeding devices, e.g. as disclosed in U.S. Pat. No. 3,230,933, to which devices feed is supplied with a system comprising a feed supply tube containing feed conveying means, feeding devices being coupled to the feed supply tube at regular intervals, in normal operation it is not possible to always fill all feeding devices simultaneously and to about the same extent, taking into consideration the large volume of feed the drop tube and in particular the pan can contain. This is caused mainly by the limited amount of feed which is to be distributed among the feeding devices, and to a lesser extent by the limited throughput of the feed supply tube and the capacity of the feed supply tube portion between two adjacent feeding devices being coupled to the tube. Starting from an empty or poorly filled feed supply tube of the feed supply system, this has the drawback that in the initial phase and in the course of a feeding operation only a limited number of feeding devices can be filled, and moreover only to a different extent. On the other hand, starting from a fully or almost fully filled feed supply system, the feed conveying means can be allowed to operate only until the daily rations of feed—which now are distributed simultaneously and evenly—have been supplied to each feeding device. Thus, after a feeding some feed remains in the feed supply system, which feed is supplied to the feeding devices during the next feeding. Consequently the situation in which the feed supply system at the beginning of a feeding is empty or almost empty, is inevitably reached periodically, with the associated drawback. The undesired result is an uneven distribution of the feed over the birds present, some birds eating more feed than the daily ration intended for each of them, and other birds capturing less feed than the daily ration of feed intended for each of them. In this way a lot of commotion develops between the birds in the breeding farm, and this situation does not contribute to their health, growth and uniformity.

The object of the invention is to bring the volume of feed to be held in the feeding device into conformity with the quantity of feed to be distributed, and with the capacity of the feed supply system, and in this way effect that all feeding devices are always filled from the start of a feeding at the same time and practically to the same extent.

According to the invention, the feeding device of the abovementioned type for this purpose is characterized in that the sum of the volume of the dish-shaped pan and the feed volume of the drop tube is at most equal to the volume of the sum of the daily rations of feed for the number of birds intended to be feeding at the feeding device at the same time at an even distribution of birds over the feeding devices in the feed supply system, such that the feed supply tube between two adjacent feeding devices coupled with the tube, is filled practically fully with feed continuously, whereby at starting conveyance of feed through the feed supply tube a first quantity of feed arrives in each feeding device of the feed supply system directly, which first quantity of feed is amply sufficient to bridge the time needed to supply the remaining quantity of feed to each feeding device, so that all feeding devices are always filled from the start of a feeding at the same time and practically to the same extent. In this context the volume of the dish-shaped pan refers to the content of the pan filled to the upper edge of the upright peripheral wall thereof. By this measure according to the invention, the volume of feed which the feeding device can contain, is greatly reduced with respect to the volume of prior art feeding devices. Accordingly, not only the intended simultaneous and even filling of the feeding devices is realized, but also the rate of eating of the birds will be lowered, since a small feed area corresponding to the small volume attained in the dish-shaped pan impedes the access to the feed. The use of feeding devices according to the invention is particularly effective in feed supply systems with a feed supply tube forming a closed loop.

In the case of chickens the daily ration for one breeder of at least about three weeks old is about 35 grams. Assuming fourteen chickens feeding at one feeding device at the same time, the sum of the daily rations of feed for one feeding device is 490 grams, the sum of the volume of the dish-shaped pan and the volume of the drop tube intended for containing feed e.g. being equal to a volume of feed corresponding to 350–400 grams of feed.

Preferably, when in a way known per se above the dish-shaped pan a spacing grille is provided, which grille extends in radial directions from the drop tube, and bounds passage openings with such dimensions, that birds put on rations cannot pass the passage openings with their body, the dimensions of the spacing grille are selected such that the largest diameter of the spacing grille is substantially greater than the diameter of the upright peripheral wall of the dish-shaped pan. In this way it can be prevented, that around the feeding device along the periphery of the dish-shaped pan too many birds pushing each other away assemble at a feeding. Moreover, the access to the feed is impeded further, and the eating rate is reduced correspondingly.

In a preferred embodiment the largest diameter of the spacing grille is at least about twice as large as the diameter of the upright peripheral wall of the dish-shaped pan. In this way, with the usual feeding device outer dimensions (for chickens a diameter of the feeding device of about 33 cm is usual) optimum conditions are created with respect to the number of birds feeding at the same time at the feeding device, and to the volume of the sum of the daily rations of feed in relation to the volume of the dish-shaped pan and the volume of the drop tube intended for containing feed.

Advantageously, around the dish-shaped pan an essentially dish-shaped spill tray with a bottom and an upright peripheral wall for catching spilled feed from the dish-shaped pan is provided. In this way, possibly spilled feed remains easily accessible for the birds being around the feeding device, so as little as possible of the daily ration of feed for each bird, which ration already is small, is lost. In a preferred embodiment the upper edge of the upright peripheral wall of the dish-shaped pan is as high as or slightly lower than the upper edge of the upright peripheral wall of the spill tray. This provides the birds, in particular when they are younger than about one week, a clear and direct view of the feed in the dish-shaped pan, so that they will find the feed easily and quickly. Preferably, for this purpose the height of the upright peripheral wall of the spill tray is at most about 6 cm. To ensure that the dish-shaped pan is emptied completely by the birds, advantageously the dish-shaped pan is shallower than the spill tray.

A large reduction of the volume of the drop tube intended for containing feed, is obtained by a filling element which is provided in the drop tube spaced from the inner wall thereof. Such a filling element can be designed in many ways, but preferably such that the transverse dimensions of the filling element decrease in the direction of the upper end of the drop tube. By this measure a good distribution of the feed over the cross-section of the drop tube available for the feed, is obtained. In a simple and effective way, the side of the filling element facing the upper end of the drop tube is essentially conical. In this context a frusto-conical form may be referred to, or also a combination of cones with different conicity extending in line with each other. However, the filling element can also be essentially paraboloidical or ellipsoidical.

In a preferred embodiment the filling element is constituted by a central upright part of the bottom of the dish-shaped pan. Such a filling element can easily be manufactured as a whole with the dish-shaped pan.

On the other hand, or in addition to this, it is possible to connect a filling element with the inner wall of the drop tube. In a preferred embodiment, such a filling element consists of a second drop tube being parallel to the first drop tube, and having an open upper end which is adapted to fit to a feed discharge opening of the feed supply system, and having an open lower end which is situated above the bottom of the dish-shaped pan. With this measure not only the effective cross-section of the drop tube for passing feed is strongly reduced, but the feed normally being thrown by the feed conveying system out of an opening in the feed supply tube essentially against one side of the first drop tube, now directly arrives in the first drop tube much more centrally. This leads to an improved distribution of the feed in the dish-shaped pan along its periphery.

The prior art feeding device has a drop tube which can be moved axially over a limited, variable distance relative to the bottom of the dish-shaped pan between a low position and a high position, the drop being provided along its circumference with feed discharge openings which in the high position of the drop tube are obstructed by a collar extending around it, and in the low position of the drop tube allow a free passage of feed. If such an arrangement is used in a feeding device according to the invention which is provided with a filling element consisting of a central upright part of the bottom of the dish-shaped pan, the drop tube and the filling element preferably are designed in such a way, that the transverse dimensions of the central upright part of the bottom of the dish-shaped pan and the cross-section of the upper part of the drop tube in the direction of the upper end of the drop tube decrease, while the lower part of the drop tube is essentially cylindrical and provided with the feed discharge openings. With these measures it can be ensured, that the cross-section of the space which is bounded by the inner wall of the drop tube and the side of the central upright part of the bottom of the dish-shaped pan facing the inner wall of the drop tube, in the low position of the drop tube in the direction of the bottom of the dish-shaped pan remains constant or increases, and in the high position of the drop tube decreases. In the low position of the drop tube, which is set when unlimited feed is supplied to very young growing breeders, the feed can consequently flow easily through the drop tube. In the high position of the drop tube, which mainly is used when the breeders are rationed, the flow of feed through the drop tube is slowed down. This contributes considerably to the intended reduction of the eating rate of the birds.

It will be clear from the above, that the reduction of the feed content of the feeding device according to the invention can be attained by reducing the size of the dish-shaped pan, or by providing a filling element in the drop tube, or by both measures in combination.

The invention is explained in more detail with the accompanying drawings, in which different embodiments of a feeding device according to the invention are shown, wherein.

The same reference numerals relate to the same parts or to parts with the same function in the figures.

Figure 1:
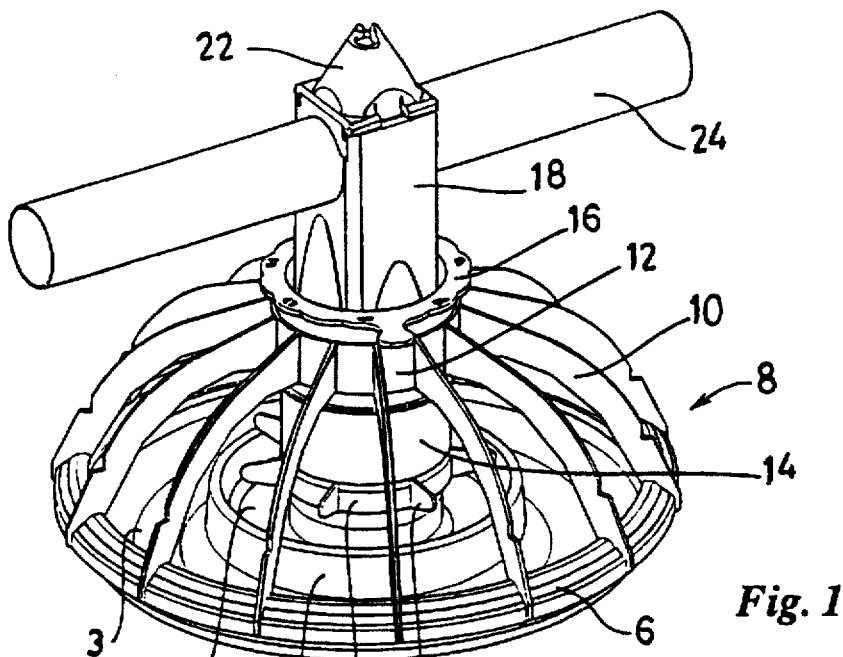
FIG. 1 shows a perspective view of a first embodiment of the feeding device according to the invention, suspended from a feed supply tube of a feed supply system.
Figure 2:
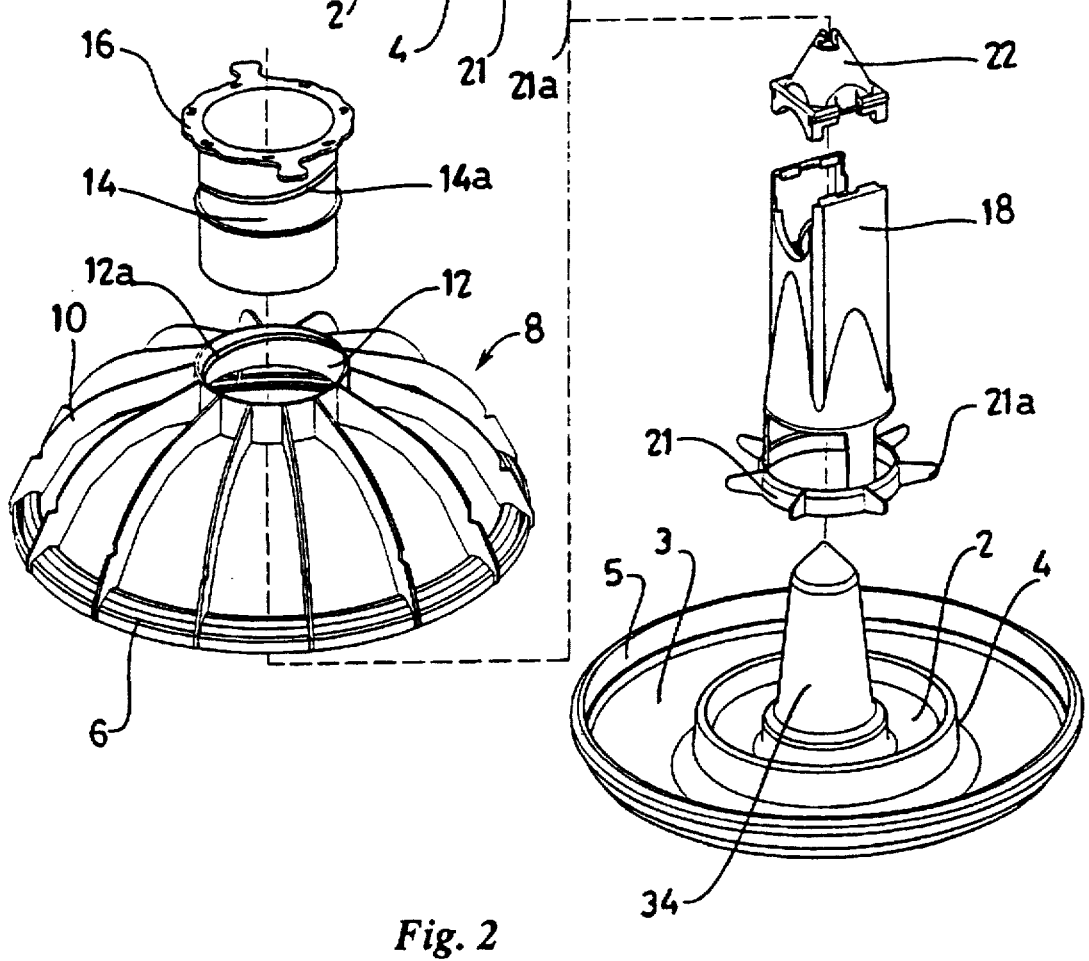
FIG. 2 shows the feeding device according to FIG. 1 on a reduced scale and in exploded view.
Figure 3:
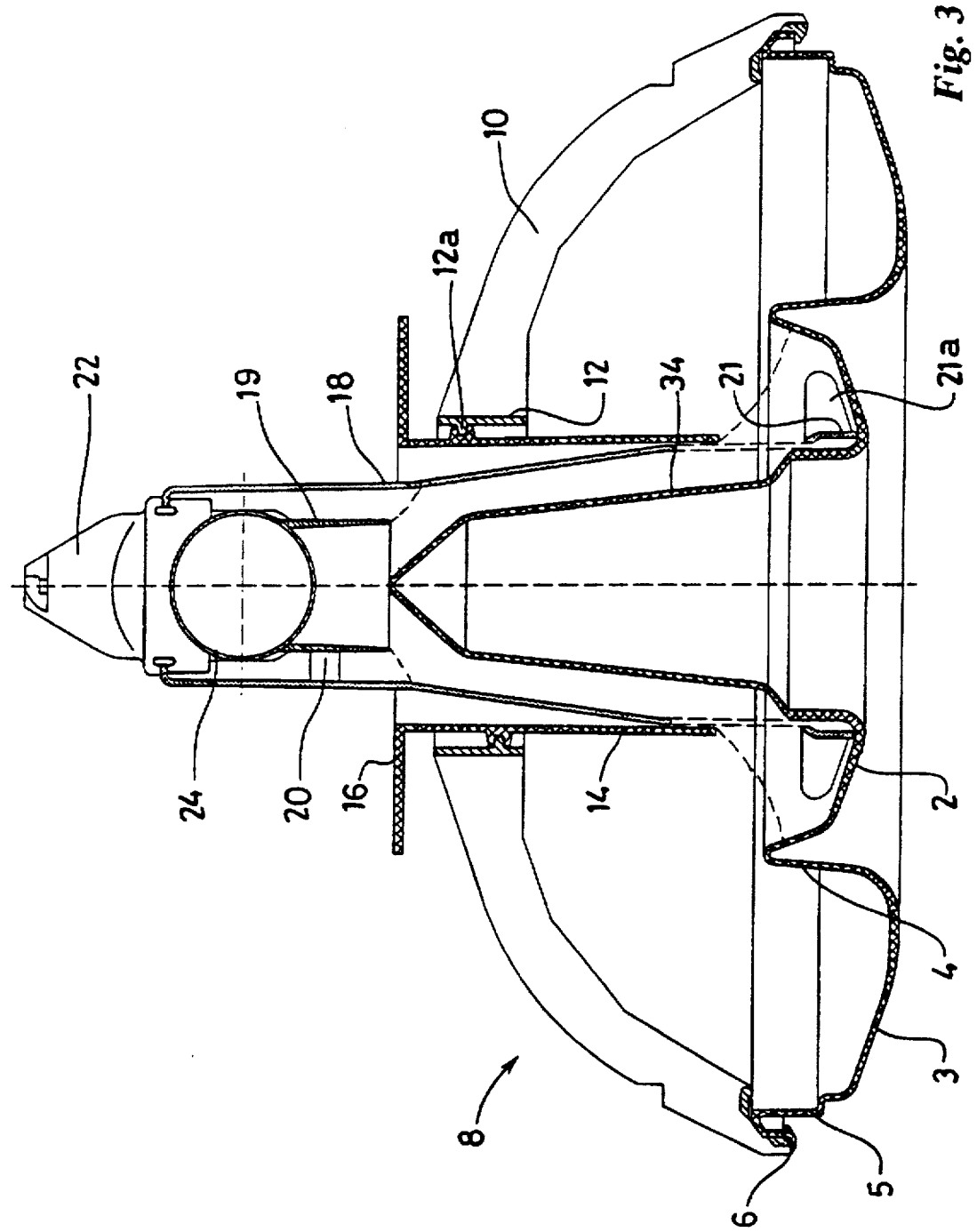
FIG. 3 shows a cross-sectional view of the feeding device according to FIG. 1, the drop tube being in its low position.
Figure 4:
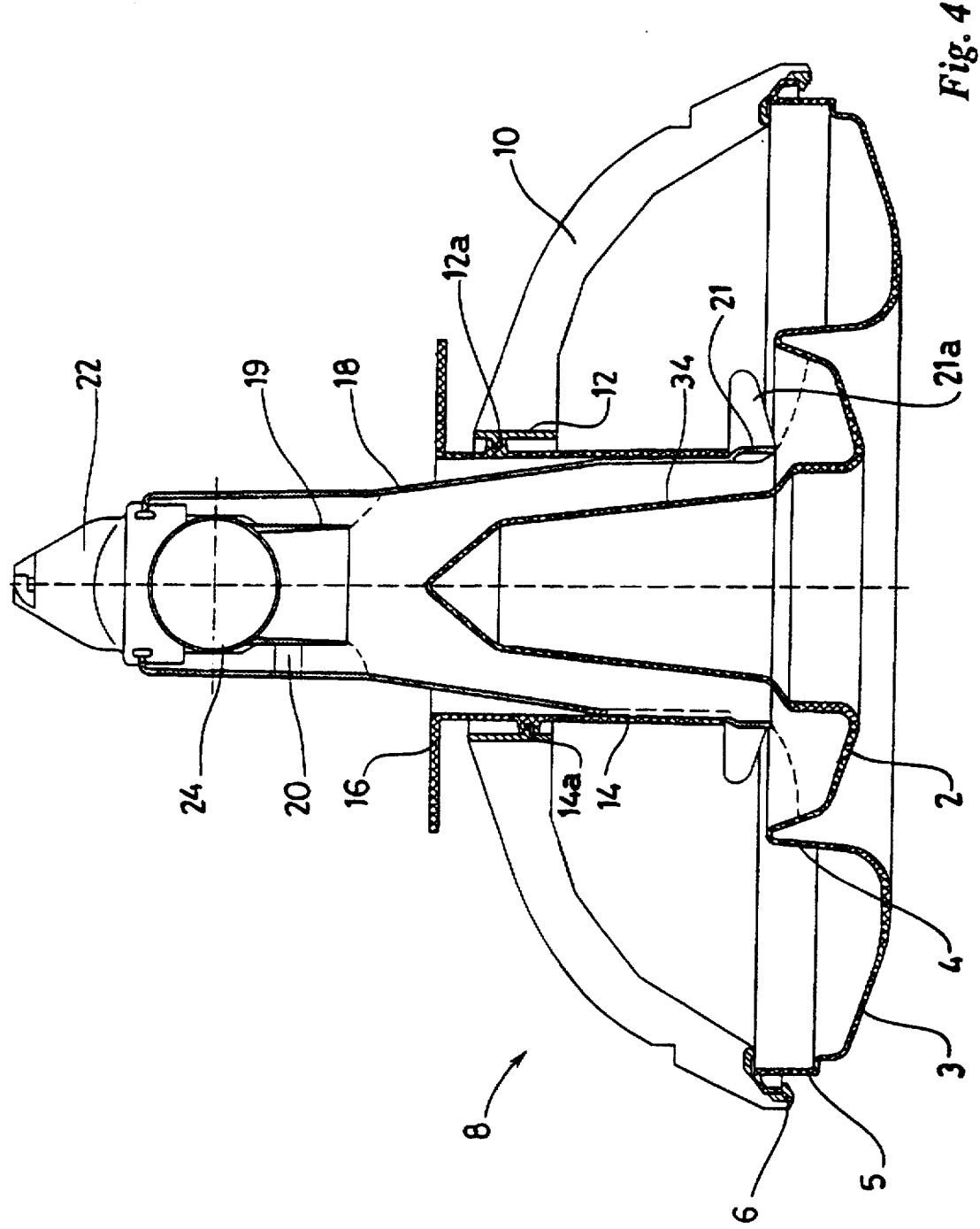
FIG. 4 shows a cross-section similar to FIG. 3, the drop tube being in its high position.
Figure 7:
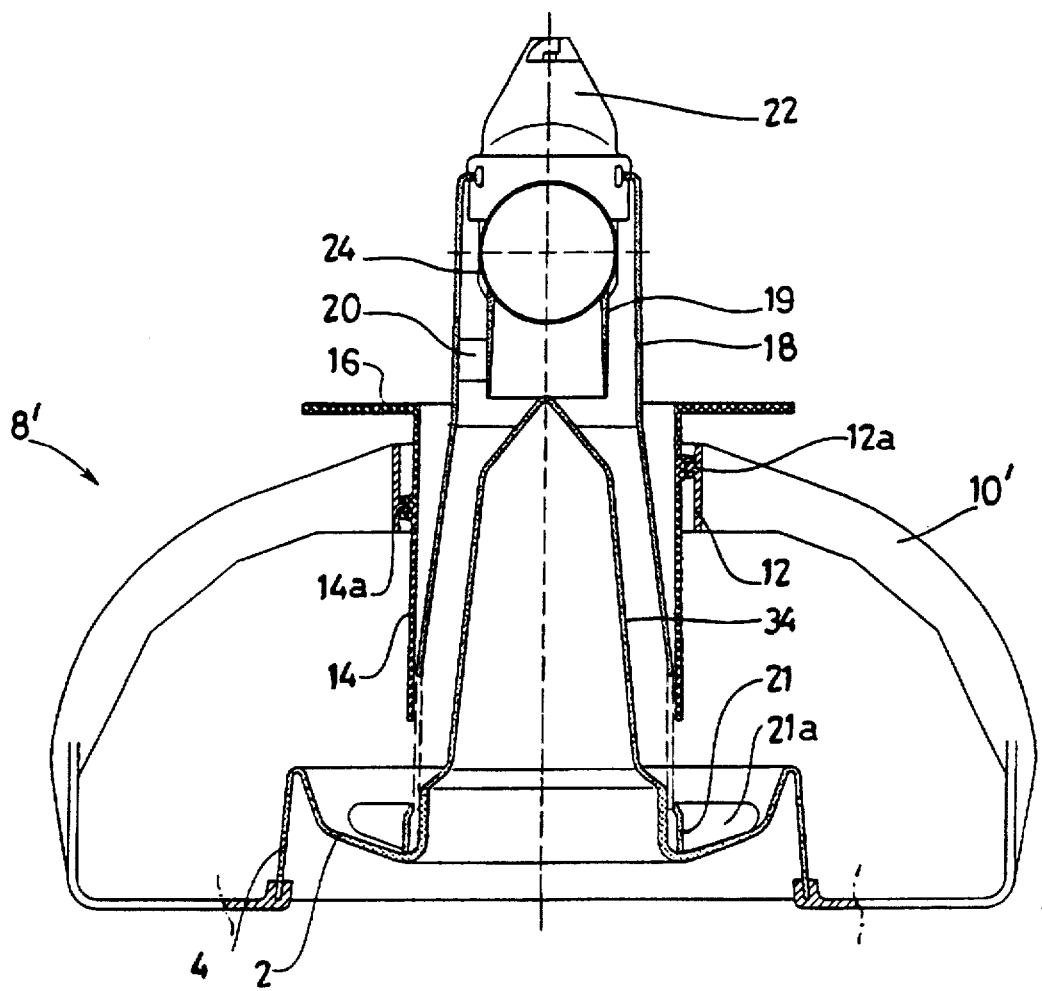
FIG. 7 shows a cross-section of a fourth embodiment of a feeding device according to the invention.

FIGS. 1–4 show a feeding device with an essentially dish-shaped pan 2 with an upright peripheral wall 4. The dish-shaped pan 2 forms a whole with an also essentially dish-shaped spill tray 3 with an upright peripheral wall 5, the spill tray extending around the pan. The spill tray 3 is not absolutely essential for the invention, and can also be omitted, as shown in FIG. 7. At the upper edge of the upright peripheral wall 5 a snap ring 6 of a grille 8 is mounted with a snap connection. The grille 8 comprises a number of flat, curved bars 10, in the present case fourteen, which bars 10 extend from the snap ring 6 to, and are connected to an annular body 12. The number of bars 10 is selected in view of a good distribution of the birds to be fed with the feeding device along the periphery of the pan 2. The annular body 12 is at the inner side thereof provided with a thread 12a, which can engage a thread 14a provided on the outer side of a cylindrical adjusting collar 14. Accordingly, the adjusting collar 14 can be moved and set in a direction towards the pan 2 and in the opposite direction by rotating the adjusting edge 16 forming a whole with it. In the adjusting collar 14 a drop tube 18 is provided, which in the longitudinal direction thereof can be moved over a limited distance. The drop tube 18 is open at the lower end and at the upper end thereof. The upper end is designed such that it can be coupled to a feed supply tube 24 of a feed supply system by means of a clamping element 22. In the feed supply tube 24 the feed by way of example is conveyed by means of a helical member (not shown) known from the prior art, the feed supply tube 24 at the position of the drop tube 18 being provided with one or more openings through which feed from the feed supply tube 24 through the drop tube 18 can be brought into the pan 2. In the upper portion of the drop tube 18 a filling element 19 designed as a second drop tube is mounted by means of radially and in the longitudinal direction of the drop tube 18 extending bridges 20. The filling element 19 has an open upper end, which connects to the or each opening of the feed supply tube 24 at the position of the drop tube 18, and an open lower end. The cross-section of the upper part of the drop tube 18 is essentially rectangular, while the lower portion of the drop tube 18 has a circular cross-section, and is partly conical, and partly cylindrical. The cylindrical portion near the lower end of the drop tube 18 is nearly completely made open by providing it with feed discharge openings, which at the lower side thereof are bounded by a ring 21 on the outside of which radial projections 21a are provided. In this arrangement, the drop tube 18 can take two defined positions: a low position which is shown in FIG. 3 and is determined by the ring 21 resting on the bottom of the pan 2, and a high position which is shown in FIG. 4 and is determined by the projections 21a abutting against the lower edge of the adjusting collar 14. It will be clear from the above, that the high position can be set within certain limits by choosing a certain angular position of the adjusting collar 14 relative to the annular body 12.

The dish-shaped pan 2 is shallower than the spill tray 3.

Centrally in the dish-shaped pan 2 there is an upright part 34, which is a whole with the bottom of the pan 2, and extends over a large part in the drop tube 18 over the length of the drop tube. In the embodiment shown in FIGS. 1–4, the upper end of the upright part 34 in the low position of the drop tube reaches to the lower edge of the filling element 19. However, the upright part 34 can also be longer or shorter.

The use of the above-described feeding device will be explained in greater detail with the aid of FIGS. 3 and 4.

In the low position of the drop tube 18 shown in FIG. 3, the feeding device rests on the ground. This low position is used for breeders which are very young, e.g. less than one week old. In this part of their lives, the birds are allowed to eat unlimited quantities of feed, and for this purpose feed is supplied to the feeding device through the feed supply tube 24 in such quantities, that at least a part of the drop tube 18 is always full. The maximum filling height of the pan 2 is indicated with dashed lines, the feed filling the space between the central upright part 34 and the drop tube 18 being at maximum on the level indicated with dashed lines in the drop tube 18. The very young birds can pass the bars 10 of the grille 8 to reach the feed present in the pan 2. The upright peripheral wall 5 of the spill tray 3 is particularly low so that it does not take away the view of the feed present in the pan 2 for the young birds. Additionally the low peripheral wall 5 can be climbed over easily by the young birds.

The high position of the drop tube 18 of the feeding device shown in FIG. 4, is set when the breeders have completed the starting period described above, and generally are more than one week old. At that moment, the feeding device generally does not rest on the ground anymore, but hangs free above the ground from the feed supply tube 24 of the feed supply system. In this case at first during a period of time which may last a few weeks, feed is still supplied to the feeding device in unlimited quantities, but after this period of time only a predetermined quantity of feed is supplied each day, which quantity is the daily ration of feed for the number of birds taking its feed from the feeding device. In FIG. 4 the maximum feed levels in the feeding device are again indicated with dashed lines. The volume of feed which the feeding device can contain is smaller than, or equal to the daily ration of feed for the number of birds taking its feed from the feeding device, by virtue of the particularly small dimensions of the dish-shaped pan 2 and the presence of the filling element 19 and the central upright part 34 in the drop tube 18. In this way the feed supply tube 24 can be filled practically fully with feed continuously, so that always a reliable and simultaneous distribution of the feed over all feeding devices being part of the feeding system, is ensured. The suspension height of the feeding device above the ground is tuned to the size of the birds to be fed. The birds are kept at a distance from the pan 2 containing the feed and distributed along the periphery of the feeding device by the grille 8, thus ensuring an even distribution of the feed over the birds at the feeding device. Due to the fact that in the feed supply tube 24 between two adjacent feeding devices coupled with the tube, feed is always present, at starting the conveyance of feed through the feed supply tube 24 a first quantity of feed arrives in each feeding device of the feeding system directly. Taking into account the limited feed content of the feeding device according to the invention and the limited eating rate possible, this starting quantity of feed is amply sufficient to bridge the time needed under ration conditions to supply the remaining quantity of feed to each feeding device.

In the embodiment of the feeding device shown in FIGS. 3 and 4 a particularly good distribution of feed over the dish-shaped pan 2 is attained. The filling element 19 in the drop tube 18 namely ensures, that the feed coming from the feed supply tube 24 comes centrally in the drop tube 18. Next, the feed is led through the space between the drop tube 18 and the upright part 34 to the pan 2. In the low position of the drop tube 18 shown in FIG. 3 the cross-section of the space determined by the drop tube 18 and the upright part 34 increases in the direction of the pan 2, making it easy for the feed to flow into the pan 2. On the contrary, in the high position of the drop tube 18 shown in FIG. 4 the cross-section of the space determined by the drop tube 18 and the upright part 34 decreases in the direction of the pan 2, impeding the flow of feed to a certain extent, and lowering the eating rate of the birds. Since in the high position of the drop tube 18 the feeding device generally hangs free from the feed supply tube 24 and hinges in a plane at right angles to the longitudinal axis of the feed supply tube, the pan 2 also being rotatable round its vertical axis of symmetry, an obstruction of the feed in the drop tube 18 is impossible, in spite of said decreasing cross-section, by virtue of the eating birds continuously pushing the feeding device and moving it to and fro.

Figure 5:
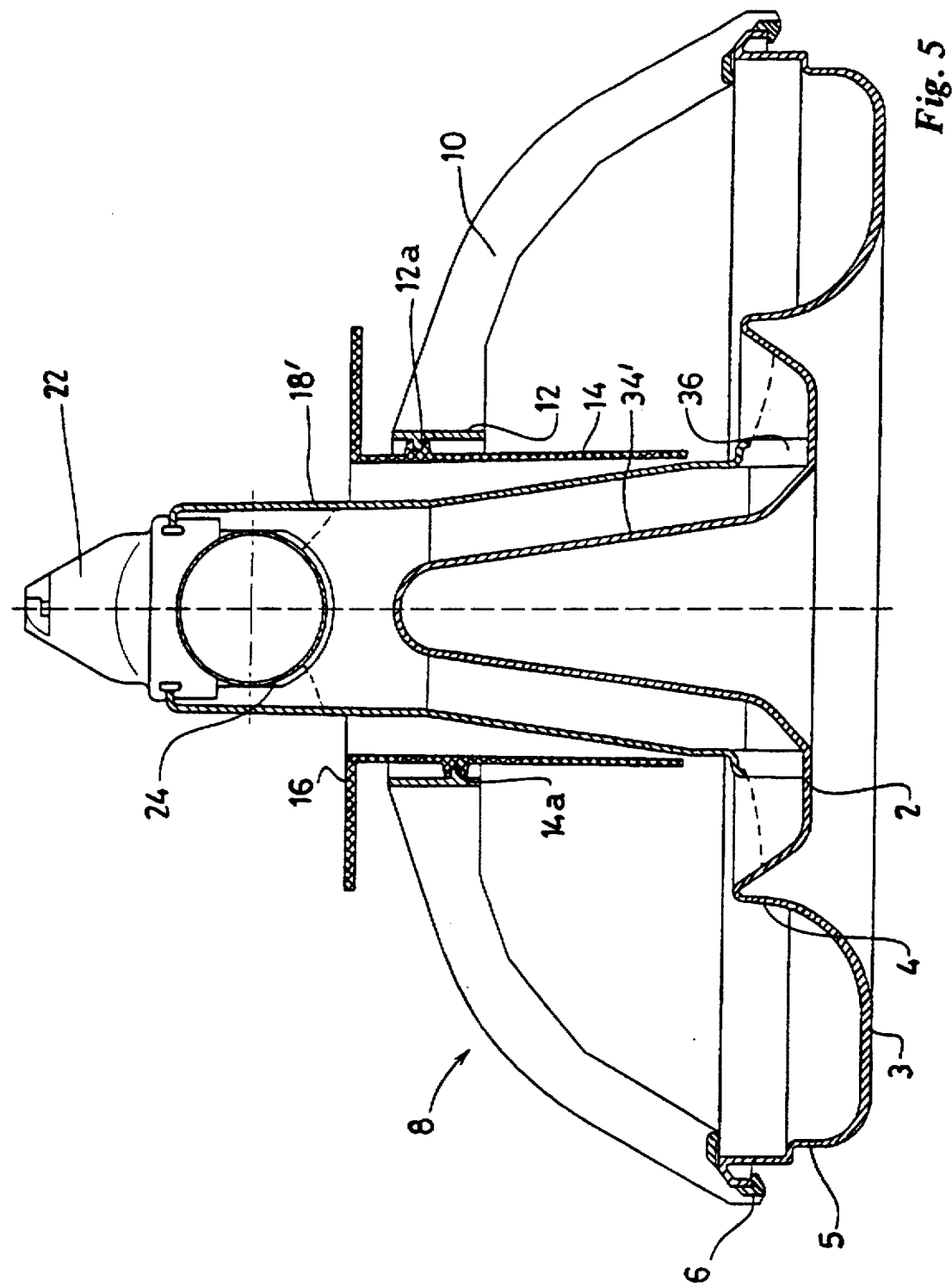
FIG. 5 shows a cross-section of a second embodiment of the feeding device according to the invention.

The embodiment of the feeding device according to FIG. 5 essentially corresponds with the embodiment shown in FIGS. 1–4, except for the drop tube 18' and the central upright part 34' of the pan 2. The drop tube 18' is at its lower end provided with legs 36 extending in the longitudinal direction of the drop tube 18' and in the radial direction. In the low position of the drop tube 18', the legs 36 ensure a predetermined distance between the lower edge of the drop tube 18' and the bottom of the dish-shaped pan 2 for the intended outflow of feed from the drop tube 18' into the pan 2. Furthermore, the drop tube 18' is near the lower end thereof provided with a radially bulging part, being a stop for determining the high position of the drop tube 18' against the lower edge of the adjusting collar 14. In the drop tube 18' there is a central upright part 34' of the bottom of the pan 2, which upright part 34' has a rounded upper end. A filling element such as 19 in FIG. 3 and 4 is omitted in this embodiment.

Figure 6:
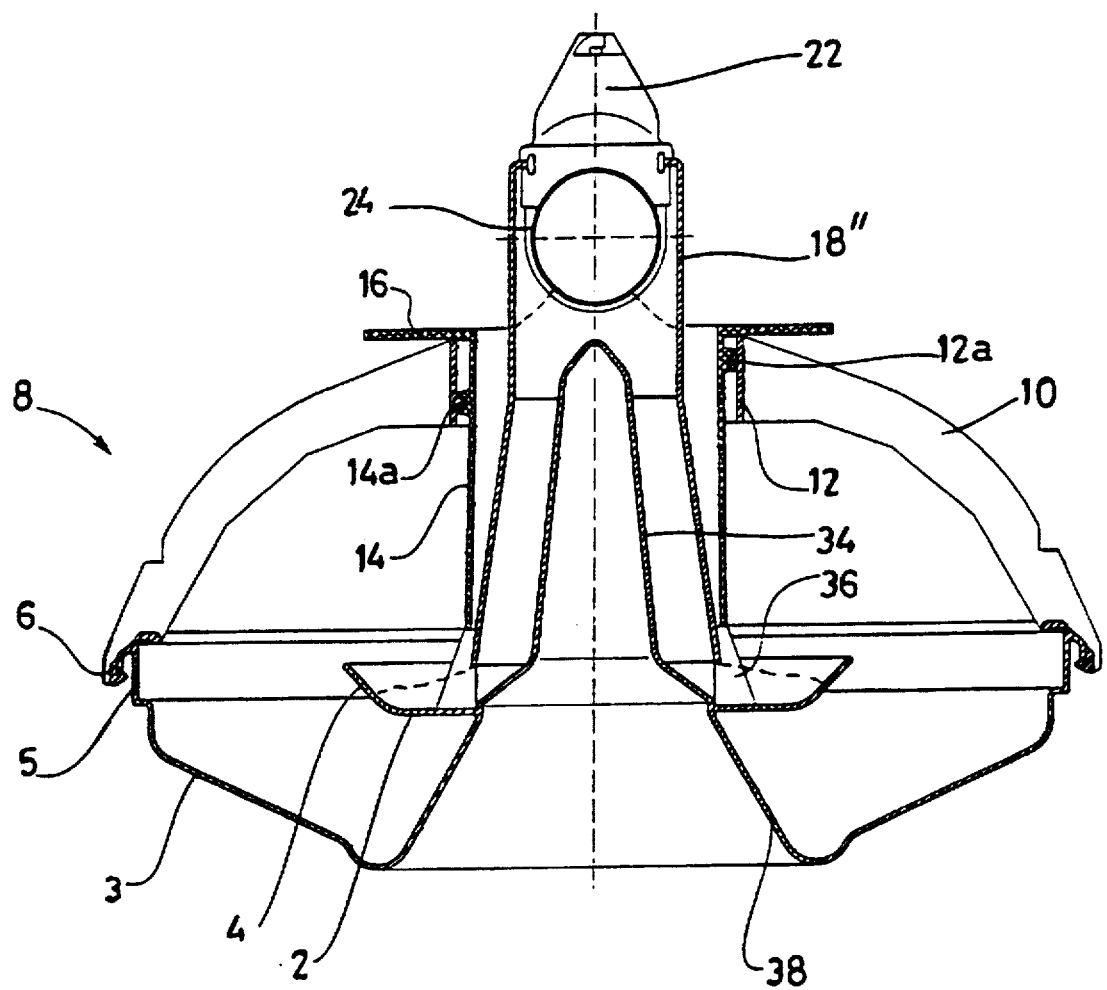
FIG. 6 shows a cross-section of a third embodiment of the feeding device according to the invention.

In the embodiment shown in FIG. 6 the spill tray 3 is provided with a frusto-conical central upright part 38, on which the dish-shaped pan 2 is fixed. The low position of the drop tube 18" shown in the figure is determined by the legs 36, by which the drop tube 18" rests on the bottom of the pan 2. The upper sides of the legs 36 are provided with a stop edge, which in the high position of the drop tube 18" abuts the lower edge of the adjusting collar 14. A central upright part 34 extends from the bottom of the pan 2 as a filling element in the drop tube 18".

The embodiment of the feeding device according to FIG. 7 essentially corresponds to the embodiment shown in FIGS. 1-4, except for the spill tray 3 which is omitted here. Therefore, the grille 8' is designed in such a way that it is fixed with its bars 10' to the upright peripheral wall 4 of the pan 2, maintaining the function of spacing element for rationed birds relative to the pan 2, and distributing element for birds being at the feeding device.

I claim:

1. Feeding device for breeder birds with a limited, predetermined daily ration of feed, comprising:
    an essentially dish-shaped pan with a bottom and an upright peripheral wall; and
    a drop tube with an open upper end which is adapted to be coupled with a feed supply system containing a number of feeding devices, and with an open lower end which is situated above the dish-shaped pan, wherein the sum of the volume of the dish-shaped pan and the feed volume of the drop tube is chosen to be at most equal to but not larger than the volume of the sum of the daily rations of feed for the number of breeder birds intended to be feeding at the feeding device at the same time at an even distribution of birds over the feeding devices in the feed supply system.

2. Feeding device according to claim 1, wherein above the dish-shaped pan a spacing grille extending in radial directions from the drop tube is provided, which spacing grille bounds passage openings with such dimensions, that birds put on rations cannot pass the passage openings with their body, wherein the largest diameter of the spacing grille is substantially greater than the diameter of the upright peripheral wall of the dish-shaped pan.

3. Feeding device according to claim 2, wherein the largest diameter of the spacing grille is at least about twice as large as the diameter of the upright peripheral wall of the dish-shaped pan.

4. Feeding device according to claim 1, wherein around the dish-shaped pan an essentially dish-shaped spill tray with a bottom and an upright peripheral wall for catching spilled feed from the dish-shaped pan is provided.

5. Feeding device according to claim 4, wherein the upper edge of the upright peripheral wall of the dish-shaped pan is as high as or slightly lower than the upper edge of the upright peripheral wall of the spill tray.

6. Feeding device according to claim 4, wherein the height of the upright peripheral wall of the spill tray is at most about 6 cm.

7. Feeding device according to claim 4, wherein the dish-shaped pan is shallower than the spill tray.

8. Feeding device according to claim 1, wherein a filling element is provided in the drop tube spaced from the inner wall thereof.

9. Feeding device according to claim 8, wherein transverse dimensions of the filling element decrease in the direction of the upper end of the drop tube.

10. Feeding device according to claim 9, wherein the side of the filling element facing the upper end of the drop tube is essentially conical.

11. Feeding device according to claim 8, wherein the filling element comprises a central upright part of the bottom of the dish-shaped pan.

12. Feeding device according to claim 8, wherein said filling element further comprises a second drop tube being parallel to the first drop tube, and having an open upper end which is adapted to fit to a feed discharge opening of the feed supply system, and having an open lower end which is situated above the bottom of the dish-shaped pan.

13. Feeding device according to claim 11, wherein the drop tube can be moved axially over a limited, variable distance relative to the bottom of the dish-shaped pan between a low position and a high position, the drop tube being provided along its circumference with feed discharge openings which in the high position of the drop tube are obstructed by a collar extending around it, and in the low position of the drop tube allow a free passage of feed, wherein the transverse dimensions of the central upright part of the bottom of the dish-shaped pan and the cross-section of the upper part of the drop tube in the direction of the upper end of the drop tube decrease, while the lower part of the drop tube is essentially cylindrical and provided with the feed discharge openings.

14. Feeding device for birds, in particular for breeders with a limited, predetermined daily ration of feed, comprising:
    an essentially dish-shaped pan with a bottom and an upright peripheral wall;
    a drop tube with an open upper end which is adapted to be coupled with a feed supply system containing a number of feeding devices, and with an open lower end which is situated above said dish-shaped pan, wherein the sum of the volume of said dish-shaped pan and the feed volume of said drop tube is at most equal to the volume of the sum of the daily rations of feed for the number of birds intended to be feeding at the feeding device at the same time at an even distribution of birds over the feeding devices in the feed supply system;
    a filling element provided in said drop tube spaced from the inner wall thereof, wherein said filling element comprises a central upright part of the bottom of said dish-shaped pan; and,
    wherein said drop tube can be moved axially over a limited, variable distance relative to the bottom of said dish-shaped pan between a low position and a high position, said drop tube being provided along its circumference with feed discharge openings which in the high position of said drop tube are obstructed by a collar extending around it, and in the low position of said drop tube allow a free passage of feed, wherein the transverse dimensions of the central upright part of the bottom of said dish-shaped pan and the cross-section of the upper part of said drop tube in the direction of the upper end of said drop tube decrease, while the lower part of said drop tube is essentially cylindrical and provided with the feed discharge openings.

15. Method for feeding breeder birds with a limited predetermined daily ration of feed, comprising the steps:
    providing a feed supply system for breeder birds, comprising at least two feeding devices coupled by a feed supply tube, each feeding device comprising an essentially dish-shaped pan with a bottom and an upright peripheral wall, each feeding device further comprising a drop tube with an open upper end which is adapted to be coupled with the feed supply tube, and with an open lower end which is situated above the dish-shaped pan, wherein the sum of the volume of the dish-shaped pan and the feed volume of the drop tube is chosen to be at most equal to but not larger than the volume of the sum of the daily rations of feed for the number of breeder birds intended to be feeding at the feeding device at the same time at an even distribution of birds over the feeding devices in the feed supply system; and filling the feed supply tube substantially full with feed, at least between adjacent feeding devices coupled with the feed supply tube, whereby upon starting conveyance of the feed through the feed supply tube a first quantity of feed arrives in each feeding device of the feed supply system directly, which first quantity of feed is sufficient to bridge the time needed to supply the remaining quantity of feed to each feeding device, so that all feeding devices coupled to the feed supply tube are filled simultaneously and to substantially the same extent.

16. Feeding device for birds, in particular for breeders with a limited, predetermined daily ration of feed, comprising:

an essentially dish-shaped pan with a bottom and an upright peripheral wall; and a drop tube with an open upper end which is adapted to be coupled with a feed supply system containing a number of feeding devices, and with an open lower end which is situated above the dish-shaped pan, wherein the sum of the volume of the dish-shaped pan and the feed volume of the drop tube is chosen to be at most equal to but not larger than the volume of the sum of the daily rations of feed for the number of birds intended to be feeding at the feeding device at the same time at an even distribution of birds over the feeding devices in the feed supply system, and wherein a filling element is provided in the drop tube spaced from the inner wall thereof.

* * * * *